(12) United States Patent
Hoffmann (10) Patent No.: US 7,944,094 B2
(45) Date of Patent: May 17, 2011

(54) POWER STATION HAVING A CONSUMER AND METHOD FOR ITS OPERATION

(75) Inventor: Jürgen Hoffmann, Untersiggenthal (CH)

(73) Assignee: Alstom Technology Ltd., Baden (CH)

( * ) Notice: Subject to any disclaimer, the term of this patent is extended or adjusted under 35 U.S.C. 154(b) by 30 days.

(21) Appl. No.: 12/541,756

(22) Filed: Aug. 14, 2009

(65) Prior Publication Data

US 2010/0013326 A1    Jan. 21, 2010

Related U.S. Application Data

(63) Continuation of application No. PCT/EP2008/051603, filed on Feb. 11, 2008.

(30) Foreign Application Priority Data

Feb. 14, 2007   (CH) ...................................... 0246/07

(51) Int. Cl.
*G05F 3/04* (2006.01)
*F01D 15/10* (2006.01)

(52) U.S. Cl. .......................................... 307/151; 290/52

(58) Field of Classification Search .................. 307/151; 290/52

See application file for complete search history.

(56) References Cited

U.S. PATENT DOCUMENTS

| | | | |
|---|---|---|---|
| 4,219,738 A | 8/1980 | Griesinger | |
| 4,786,852 A | 11/1988 | Cook | |
| 5,520,512 A | 5/1996 | Walker et al. | |
| 5,554,509 A | 9/1996 | Colucci et al. | |
| 5,689,141 A | 11/1997 | Kikkawa et al. | |
| 5,694,026 A | 12/1997 | Blanchet | |
| 6,519,170 B2 | 2/2003 | Lacaze et al. | |
| 6,530,240 B1 * | 3/2003 | Kountz et al. | 62/611 |
| 6,628,005 B2 | 9/2003 | Nelson et al. | |
| 6,906,432 B2 * | 6/2005 | Belokon et al. | 290/52 |
| 6,979,914 B2 | 12/2005 | McKelvey et al. | |
| 7,084,524 B2 * | 8/2006 | Lacaze et al. | 307/3 |
| 7,231,877 B2 * | 6/2007 | Kumar | 105/35 |
| 7,317,998 B2 | 1/2008 | Lacaze et al. | |
| 7,321,835 B2 | 1/2008 | Lacaze et al. | |

(Continued)

FOREIGN PATENT DOCUMENTS

AU    785125 B2    10/2002

(Continued)

OTHER PUBLICATIONS

Offringa, L.L.J. And Duarte, J.L. "A 1600 Kw IGBT Converter With Interphase Transformer For High Speed Gas Turbine Power Plants" Proc. IEEE—IAS Conf. 2000, Oct. 4, 8-12, 2000, Rome, 2000, pp. 2243-2248.

(Continued)

*Primary Examiner* — Hal I Kaplan
(74) *Attorney, Agent, or Firm* — Volpe and Koenig, P.C.

(57) ABSTRACT

A power station (40) is provided having a turbine section including a gas turbine (12) and a generator (28) which is driven directly by the gas turbine (12) and produces alternating current at a first operating frequency, and whose output can be connected to a consumer (V) having a predetermined second operating frequency. Increased flexibility for design and operation of the power station (40) is achieved in that an electronic decoupling apparatus (27), which decouples the two operating frequencies from one another, is arranged between the generator (28) and the consumer (V).

16 Claims, 6 Drawing Sheets

U.S. PATENT DOCUMENTS

| | | |
|---|---|---|
| 7,466,574 B2 | 12/2008 | Lacaze |
| 2002/0079706 A1 | 6/2002 | Rebsdorf et al. |
| 2003/0137855 A1 | 7/2003 | Miguchi |
| 2003/0189339 A1 | 10/2003 | Gupta et al. |
| 2004/0119293 A1 | 6/2004 | McKelvey et al. |
| 2004/0222640 A1 | 11/2004 | McKelvey et al. |
| 2004/0264089 A1 | 12/2004 | Furuya et al. |
| 2005/0001598 A1 | 1/2005 | Belokon et al. |
| 2005/0237774 A1 | 10/2005 | Lacaze et al. |
| 2006/0272331 A1* | 12/2006 | Bucker et al. .......... 60/774 |
| 2008/0079400 A1 | 4/2008 | Lacaze |

FOREIGN PATENT DOCUMENTS

| | | |
|---|---|---|
| DE | 3140241 A1 | 4/1983 |
| DE | 4438186 A1 | 5/1996 |
| DE | 10221594 A1 | 11/2003 |
| DE | 10336659 A1 | 6/2004 |
| DE | 102004016453 A1 | 11/2005 |
| DE | 102004016463 A1 | 11/2005 |
| DE | 102004016464 A1 | 11/2005 |
| EP | 0257385 A1 | 3/1988 |
| EP | 0858153 A1 | 8/1998 |
| EP | 1199794 A1 | 4/2002 |
| EP | 1253388 A | 10/2002 |
| GB | 937717 A | 9/1963 |
| JP | 6277098 A | 4/1987 |
| JP | 2002227660 A | 8/2002 |
| WO | 2004045058 A1 | 5/2004 |
| WO | 2005047789 A2 | 5/2005 |
| WO | 2005124985 A1 | 12/2005 |
| WO | 2006103159 A1 | 5/2006 |

OTHER PUBLICATIONS

F. Joos et al. "Field Experience With the Sequential Combustion System of the GT24/GT26 Gas Turbine Family" ABB Review No. 5, p. 12-20 (1998)).

* cited by examiner

POWER STATION HAVING A CONSUMER AND METHOD FOR ITS OPERATION

CROSS REFERENCE TO RELATED APPLICATIONS

This application is a continuation of International Application No. PCT/EP2008/051603 filed Feb. 11, 2008, which claims priority to Swiss Patent Application No. 00246/07, filed on Feb. 14, 2007, the entire contents of all of which are incorporated by reference as if fully set forth.

FIELD OF INVENTION

The present invention relates to the field of power station technology.

BACKGROUND

Gas liquefaction technologies are increasingly also being used for the purposes of transportation and distribution of natural gas, in order to reduce the volume and to allow the gas to be transported at low cost in liquefied form, for example using special tankers.

Large natural gas liquefaction installations use powerful compressors, by which the natural gas is compressed in the course of the liquefaction process. Gas turbines are increasingly being used to drive these compressors and, for example, they use the available natural gas as a fuel. These gas turbines have normally been developed for driving generators for production of electrical power, which is then fed into an electrical grid at a predetermined grid frequency (for example 50 Hz or 60 Hz).

Figure 1:
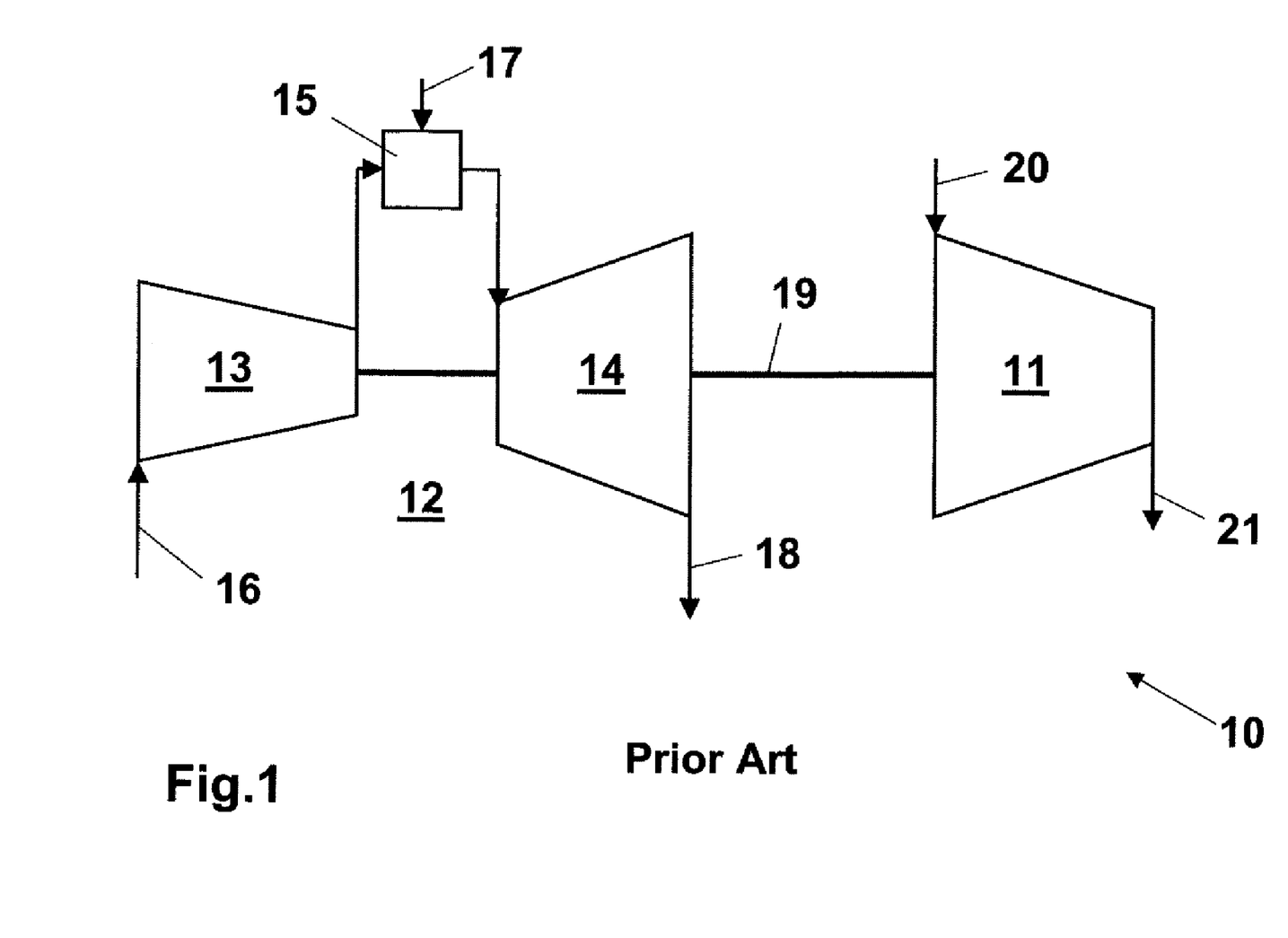
FIG. 1 shows a highly simplified circuit diagram of a power station having a gas turbine and a directly driven external compressor, according to the prior art.

FIG. 1 shows a highly simplified illustration of a compressor section 10 of a known type, in which a gas turbine 12 directly mechanically drives a compressor 11 of a natural gas liquefaction installation via a shaft 19. The compressor 11 inducts gas via a gas inlet 20 and emits compressed gas at a gas outlet 21. In the simplest case, the gas turbine 12 comprises a compressor 13 which inducts and compresses combustion air via an air inlet 16. The compressor 13 may comprise a plurality of partial compressors connected one behind the other, which operate at a rising pressure level and may possibly allow intermediate cooling of the compressed air. The combustion air compressed in the compressor 13 is passed to a combustion chamber 15, into which liquid fuel (for example oil) or gaseous fuel (for example natural gas) is injected via a fuel supply 17, and is burnt with combustion air being consumed.

The hot gases emerging from the combustion chamber 15 are expanded in a downstream turbine 14 with work being carried out, and thus drive the compressor 13 of the gas turbine and the coupled compressor 11 of the natural gas liquefaction installation. The rotation speed of the gas turbine 12 is in this case the same as the rotation speed of the external compressor 11.

The large gas turbine units that are currently standard with powers of more than 50 MW are designed for gas-turbine rotation speeds of 3600 rpm (for a grid frequency of 60 Hz) or 3000 rpm (for a grid frequency of 50 Hz). Precautions therefore have to be taken in order to accelerate the gas turbine together with the compressor to the rated rotation speed, and to dispose of excess power from the gas turbine.

U.S. Pat. No. 5,689,141 discloses a drive system for the compressor of a natural gas liquefaction installation, in which the compressor is driven directly on one side by a gas turbine and is connected on the other side to a synchronous machine. The synchronous machine drives the compressor section during acceleration of the gas turbine, and for this purpose draws power from an electrical grid. When the gas turbine has reached its rotation speed, the synchronous machine operates as a generator, and can convert excess power produced by the gas turbine to electricity, and can feed this back into the electrical grid.

Figure 2:
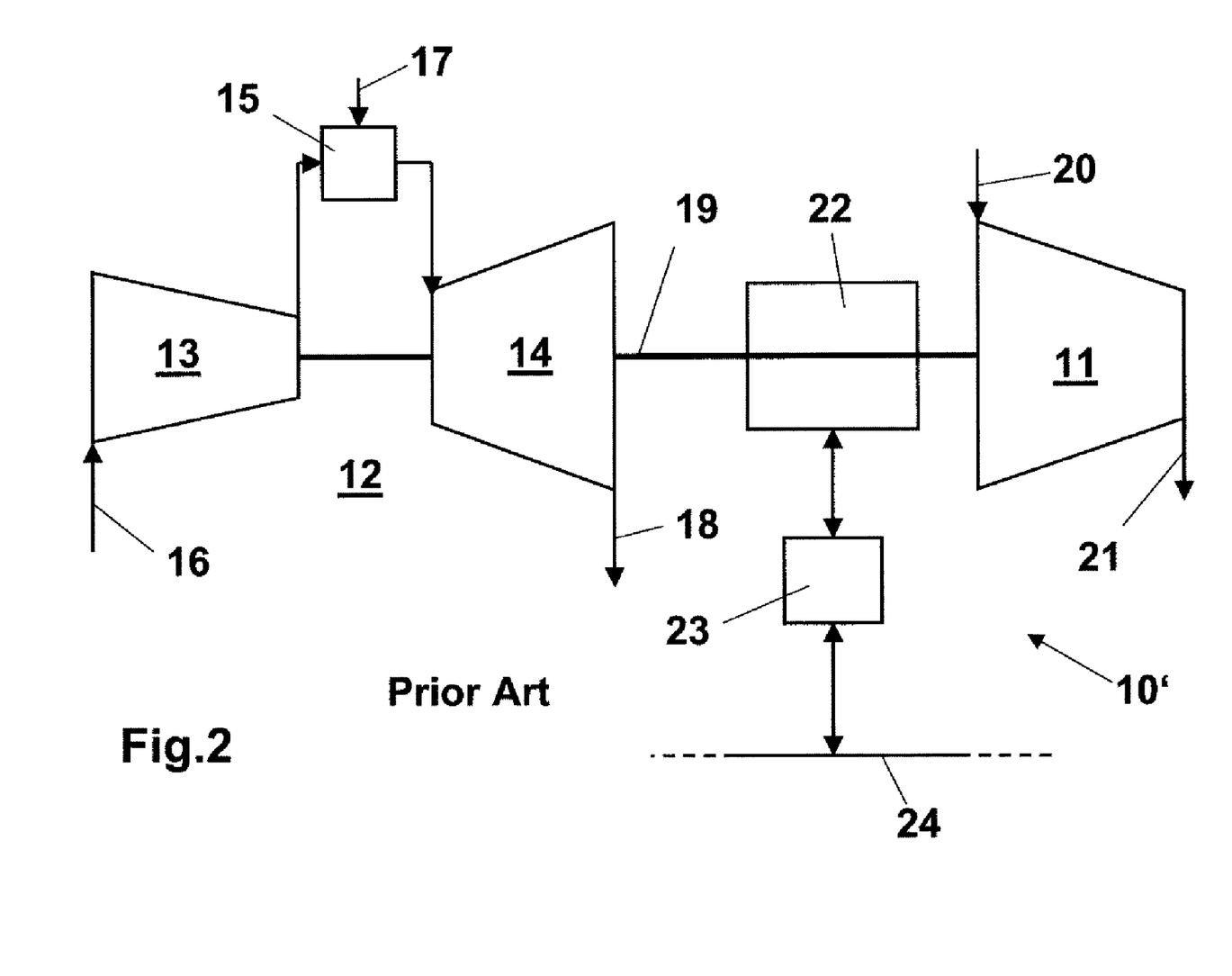
FIG. 2 shows a highly simplified circuit diagram of a power station having a gas turbine and a directly driven external compressor, and a motor/generator connected between them, according to the prior art.

International Patent Application Publication No. WO-A2-2005/047789 discloses a comparable arrangement. As illustrated in FIG. 2, a motor/generator 22 is provided on the common shaft 19 between the gas turbine 12 and the external compressor 11, which is connected to an electrical grid 24 via a variable frequency drive 23. The variable frequency drive 23 ensures soft starting of the compressor section 10', and feeds excess power at the grid frequency into the electrical grid 24 when the motor/generator 22 is operating as a generator.

The following disadvantages result from the rigid coupling between the turbine rotation speed and the rotation speed of the compressor 11:
- stable operation on the external compressor is possible only to a restricted extent.
- compressor-independent power control of the power station is impossible.
- compressor-independent efficiency optimization of the power station is impossible.
- partial load optimization of the power station independently of the grid frequency is impossible.
- emission control of the gas turbine is possible only a restricted extent.

The following disadvantages result from the rigid coupling between the turbine rotation speed and the rotation speed of the compressor for existing installation concepts with components to be newly developed and new installations:
- compressors and turbines cannot be designed for the optimum point fixed rotation speed coupling, as is possible in the case of rotation speed independence.
- gas and steam turbines which are designed with fixed rotation speed coupling are not necessarily cost-optimum for a desired power since the predetermined rotation speed means that aerodynamic or mechanical design limits impede the optimization process, and these design limits can be better matched with one another by rotation speed variability.
- the gas turbines cannot be optimally matched to the variable environmental conditions.

SUMMARY

The present disclosure is directed to a power station having a turbine section that includes a gas turbine and a generator which is driven directly by the gas turbine and produces alternating current at a first operating frequency, and whose output can be connected to at least one consumer having a predetermined second operating frequency. A frequency converter in the form of a matrix converter is arranged as an electronic decoupling apparatus, which decouples the two operating frequencies from one another, between the generator and the at least one consumer.

The disclosure is also directed to a method for operating the above power station. The method includes controlling a mechanical or aerodynamic rotation speed of the gas turbine at a constant value.

BRIEF DESCRIPTION OF THE DRAWINGS

The invention will be explained in more detail in the following text with reference to exemplary embodiments and in conjunction with the drawings, in which.

DETAILED DESCRIPTION OF THE PREFERRED EMBODIMENTS

Introduction to the Embodiments

The object of the disclosure is to provide a power station for supplying a consumer, which avoids the disadvantages of known power stations and is distinguished in particular by flexible operation with high efficiency at the same time, and to specify a method for its operation.

One notable point of the disclosure is that the gas turbine exclusively drives a generator, and that an electronic decoupling apparatus is arranged between the generator and the at least one consumer, and decouples the two operating frequencies of the generator and of the consumer from one another. The gas turbine is in this case preferably designed for a power of more than 50 MW.

According to one refinement, the first operating frequency differs considerably from the second operating frequency, with the first operating frequency being lower than the second operating frequency, and the second operating frequency being 50Hz or 60Hz. In particular, the second operating frequency may be 60Hz, and the first operating frequency 50Hz.

Alternatively, the first operating frequency is higher than the second operating frequency, with the second operating frequency being 50 Hz or 60 Hz. In particular, the second operating frequency may be 50 Hz, and the first operating frequency 60 Hz.

The electronic decoupling apparatus is preferably a frequency converter in the form of a matrix converter, which has a plurality of controllable bi-directional switches which are arranged in an (m×n) matrix and selectively connect m inputs to n outputs controlled by a controller, where m is greater than n, and wherein a first device is provided for determining the polarities of the currents in the inputs, and a second device is provided for determining the mathematical polarities of the voltages between the inputs, and wherein the first and second device are operatively connected to the controller. Bi-directional switches may comprise a single component, or may be formed from a plurality of components. For example, two back-to-back parallel-connected thyristors with an opposite forward-biased direction may be used as controllable bidirectional switches. By way of example, the devices for determining the mathematical polarity of currents and voltage may be ammeters and voltmeters, respectively. Alternatively, for example, it is also possible to use binary sensors, which emit only the polarities.

The gas turbine is preferably in the form of a gas turbine with sequential combustion.

According to one refinement of the disclosure, the consumer is a compressor which is driven by a motor and is part of an installation for liquefaction of gas, in particular natural gas (LNG).

According to another refinement of the disclosure, the consumer is a railway electrical grid.

According to a further refinement of the disclosure, the consumer is an electrical grid. In particular, the power station may be used for electrical grids at different frequencies. A further special application is selective electrical power supply into an electrical grid at 50 Hz, and an electrical grid at 60 Hz, as is advantageous in the boundary areas of countries or regions with different electrical grids.

Furthermore, within the scope of the disclosure, it is feasible to allow the output of the generator to be connected to an electrical grid, and for a switching device to be provided for selective connection of the generator to the electrical grid and to the consumer.

DETAILED DESCRIPTION

Figure 3:
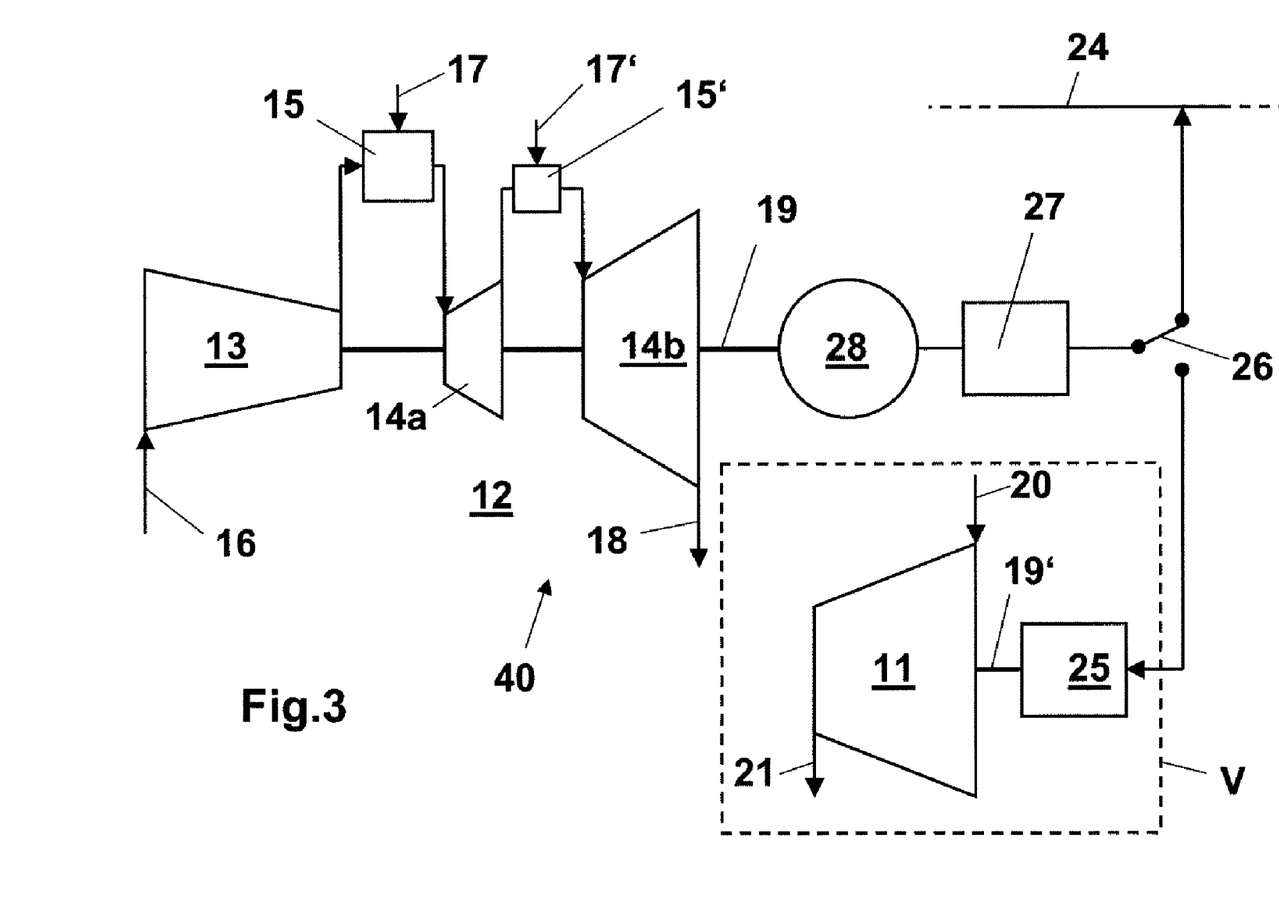
FIG. 3 shows a highly simplified circuit diagram of a power station having a gas turbine, a generator and a consumer, as well as an electronic decoupling apparatus according to one exemplary embodiment of the invention.

FIG. 3 shows a highly simplified circuit diagram of a power station having a gas turbine, a generator and a consumer, as well as an electronic decoupling apparatus according to one exemplary embodiment of the invention. The power station 40 has a gas turbine 12 with a compressor 13 and sequential combustion, in which a first combustion chamber 15 produces hot gas by a first fuel via a first fuel supply 17. Hot gas is expanded in a first turbine 14a, is then passed to a second combustion chamber 15' where the temperature of the hot gas is increased for a second time using a second fuel via a second fuel supply 17', and the hot gas is then expanded in the second turbine 14b. However, it is also possible to provide single-stage combustion instead of the sequential combustion, which is particularly advantageous in terms of efficiency.

A generator 28 is directly coupled to the shaft 19 of the gas turbine 12. The generator 28 therefore rotates at the same rotation speed as the gas turbine 12. The output of the generator 28 can be connected to a consumer V which, in the present example, is a compressor 11, driven by an electric motor 25, of a natural gas liquefaction installation having a gas inlet 20 and a gas outlet 21. However, other consumers which require AC voltage at a specific operating frequency are also feasible, for example a railway electrical grid. An electronic decoupling apparatus 27 is arranged between the output of the generator 28 and the consumer V and ensures decoupling between the first operating frequency, as produced in the generator 28, or the rotation speed of the gas turbine 12, and the second operating frequency of the consumer V.

The power station 40 in FIG. 3 can supply the consumer V directly and exclusively. However, it is also feasible to allow it to feed the electrical power that is produced selectively into an electrical grid 24, in which case the operating frequency can be matched to the grid frequency on the basis of the electronic decoupling apparatus 27, without having to change the rotation speed of the gas turbine 12. In the schematic diagram shown in FIG. 3, a switching device 26 is provided at the output of the electronic decoupling apparatus 27, by which the power produced by the power station 40 can be selectively emitted to the electrical grid 24 or to the consumer V.

Figure 4:
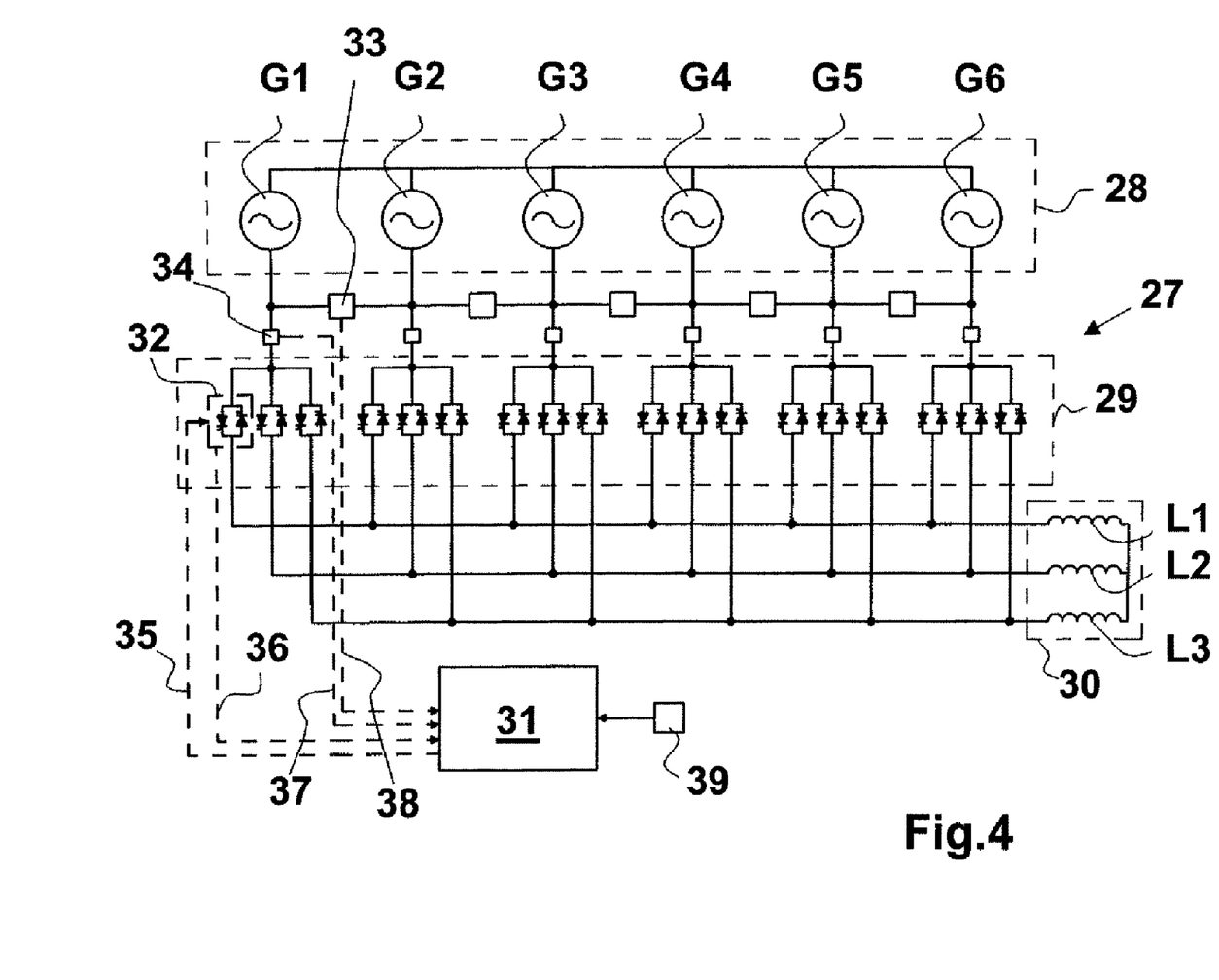
FIG. 4 shows an example of the internal design of a matrix converter, as may be used as an electronic decoupling apparatus in an installation as shown in FIG. 3.
Figure 5:
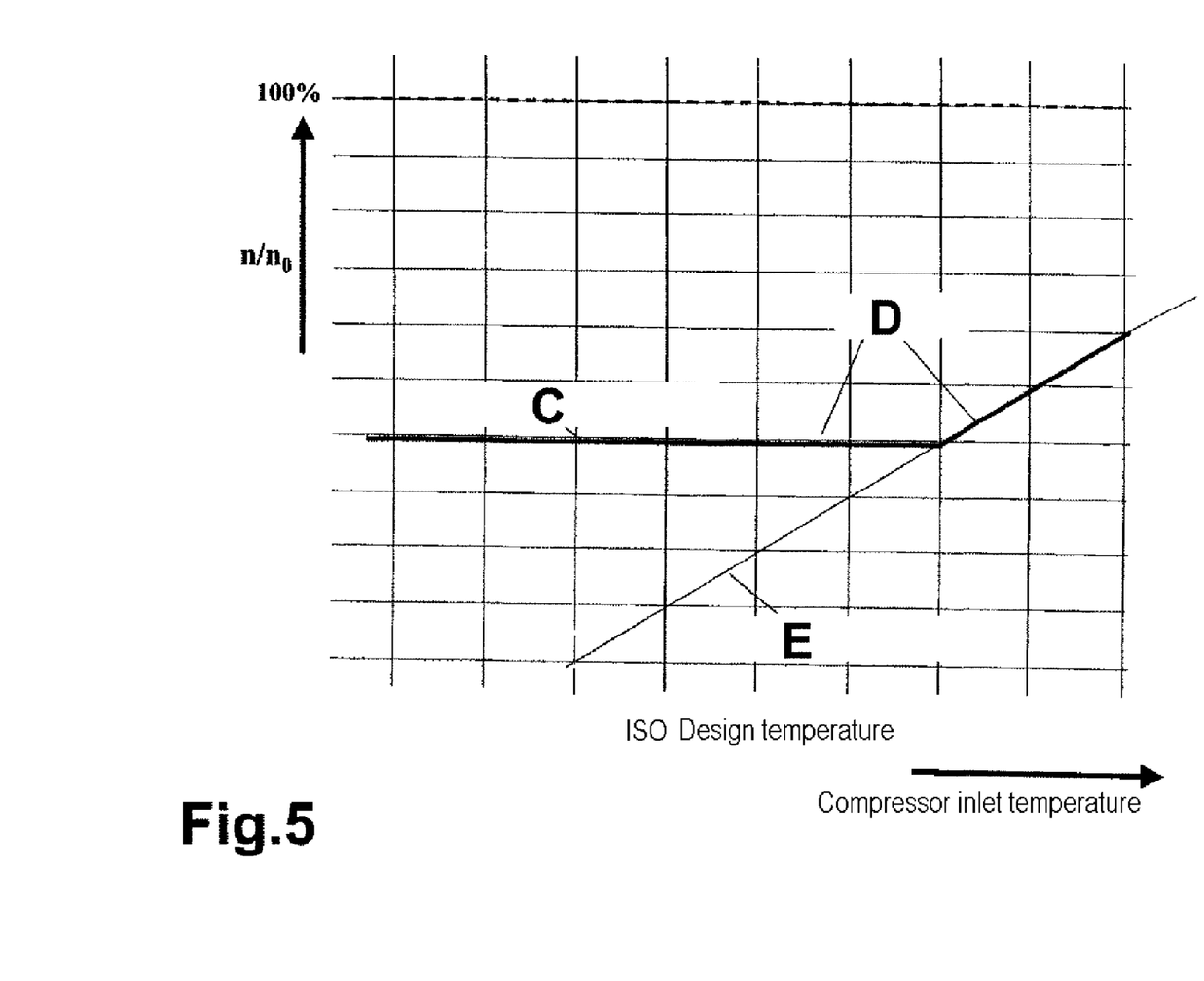
FIG. 5 shows the relationship between the rotation speed $n/n_0$ and the compressor inlet temperature.

In order to limit the power losses, the electronic decoupling apparatus 27 is preferably in the form of a matrix converter without a direct current intermediate circuit. The design and method of operation of a matrix converter this, which operates with particularly low losses by virtue of its drive, have been described in EP A2 1 199 794. Further embodiments relating to a matrix converter such as this can be found in EP A1 1 561 273, in DE A1 10 2004 016 453, in DE A1 10 2004 016 463 and in DE A1 10 2004 016 464. FIG. 4 shows the outline circuit diagram of a matrix converter with six input phases and three output phases. The matrix converter (27) sequentially connects six phases G1, ..., G6 of a generator 28 as a source to three phases L1, ..., L3 of a load 30. The power section 29 which is required for this purpose comprises eighteen bi-directional switches 32 in the form of back to back parallel connected thyristors (in the general case, there are m×n switches for m input/source phases and n output/load phases). The switches 32 are arranged in a (6×3) matrix. A control system or a controller 31 is provided for driving the switches 32, and receiving time signals (a clock frequency) from a timer 39. The switching state of the switches 32 (ON, OFF) is monitored, and is in each case signaled to the controller 31 via a first signal line 36. The switches 32 are each driven by the controller 31 via a control line 35.

A current measurement device 34 is arranged in each of the individual phases G1, ..., G6 of the generator 28, and signals the polarity of the phase current via a second signal line 37 to the controller 31. Furthermore, voltage measurement devices 33 are arranged between the phases G1, ..., G6 of the generator 28 and signal the polarity of the respective phase difference voltage via a third signal line 38 to the controller 31. Reference should be made to the abovementioned documents for details relating to the operating procedure of the matrix converter.

The decoupling apparatus 27, in particular in the form of a matrix converter of the described type, results in the following advantages of electronic decoupling:

The operating optimum (power, efficiency) of the gas turbine can be adapted as a function of the environmental conditions (for example the inlet temperature).

The power can be increased.

The efficiency can be improved.

The flexibility in the event of load fluctuations, and the life of the turbine, can be improved. The turbine can run at a constant rotation speed. The emission values can be improved. The additional degree of freedom of a variable rotation speed allows a desired power to be produced at a higher or lower rotation speed. When a gas turbine is used as a drive, this is associated with lower or higher turbine inlet temperatures, with the effect of influencing the emissions of $CO_2$ and $NO_x$.

decoupling of the operating frequencies makes it possible to design power stations in which the physical size for a desired power can be minimized, to be precise by the additional degree of freedom that the rotation speed can be adjusted independently of the consumer (for example a turbine for 3300 rpm is considerably smaller than a turbine for 3000 rpm). This also makes it possible to reduce the construction costs.

The primary capability according to the disclosure of making it possible to operate a turbine section (turbine and generator) within a power station in a stable form at a desired rotation speed independently of the operating frequency of the consumer, when switched to the electrical grid 24, assists in the stabilization of the electrical grid 24. In the event of frequency dips, the power station must be able to maintain the power emitted at the normal grid frequency and ideally even to emit more power to the electrical grid. Previous power station systems can ensure this only to a limited extent. In the case of a system which is rigidly coupled to the grid frequency, a reduction in the grid frequency results in an undesirable reduction in the rotation speed of the turbine and the generator. After a short phase during which kinetic energy is fed into the electrical grid from the gas turbine/generator shaft section as a result of the reduction in the rotation speed, the emitted power falls, while the operating parameters are otherwise the same. In this case, a gas turbine system reacts with a reduced induction mass flow and considerably increased fuel supply, thus leading to an increased hot-gas temperature within the turbine. This in turn considerably reduces the life of the turbine, as a result of which the operating costs of the installation rise. The hazardous emissions in the form of $NO_x$ are likewise considerably increased in this operating phase. Two limits have therefore already been defined, which greatly restrict any power increase in the event of a grid frequency drop—life and emissions. The mechanical and aerodynamic compatibility play a role as third aspect. Major frequency drops of more than 6% lead to power stations being shut down since they are mechanically unable to continue to operate at correspondingly reduced rotation speeds. At a lower aerodynamic rotation speed:

$$n^* = n_{mech} \frac{p}{\sqrt{kT}}, n_{mech} = \text{mechanical rotation speed,}$$

Figure 6:
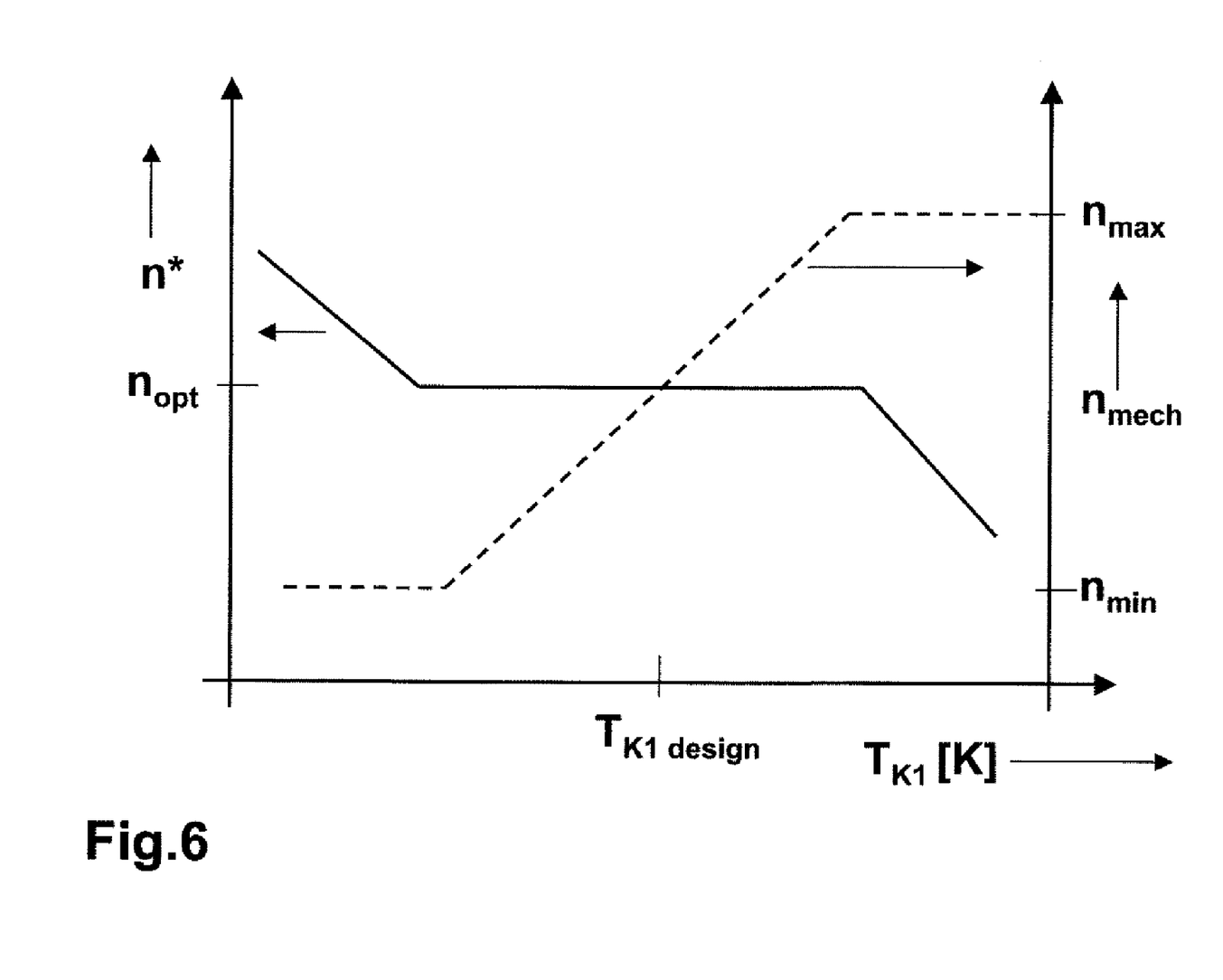
FIG. 6 shows the control of the aerodynamic rotation speed n* and of the mechanical rotation speed $n_{mech}$ plotted against the compressor inlet temperature $T_{K1}$.

(where p=power; k=Boltzmann constant and T=temperature) the operation is furthermore restricted by the surge limit of the compressor (see FIG. 6; C=mechanical rotation speed limit, D=load shedding and E=compressor surge protection).

All of the disadvantages mentioned above are obviated by a consumer-decoupled system. There is no restriction with regard to the minimum permissible frequency fluctuations, since the turbine section does not follow the applied rotation speed fluctuation. As a result, there are also no increases in hazardous emissions, or reductions of life.

In addition to network stabilization, a consumer-independent power station system also allows power and efficiency optimization at each operating point, in particular even at partial load operating points. Suitable rotation speed control as a function of the operating point, within the scope of the permissible mechanical limits, results either in emission reduction and fuel saving as a result of the increase in the turbine efficiency, or alternatively a power increase, which increases the flexibility of a power station for covering peak loads.

A further positive aspect of a consumer-independent power station system is the better capability to match an installation to different location conditions. In particular, there are various environmental conditions, such as external temperatures, air humidity, and fuel composition, which influence the operating state of a power station. The additional degree of freedom of consumer-independent rotation speed control makes it possible to produce optimized operating conditions in each case, corresponding to the current environmental conditions. This allows efficiency improvements or power increases.

All of the aspects mentioned above may be implemented for existing turbines. Furthermore, various options are opened up as to how gas turbines can be optimized, when the rotation speed of the gas turbine is not limited by the second operating frequency of the consumer.

Turbo components, compressors and turbines, can be designed with new constraints. Until now, in the case of stationary gas turbines, it has also been necessary to take account of a minimum operating range of about +/− 10% reduced rotation speed as a safety window. This ensures that the gas turbine can on the one hand address mechanical rotation speed fluctuations. On the other hand, it is possible to address changes in the inlet temperature, which reduce the rotation speed in the ratio $1/(T_{inlet})^{1/2}$. If the required reduced rotation speed range is restricted by an optimized operating concept, both an efficiency improvement and a power gain can be achieved by a redesign of the compressor and turbine blade system.

During operation of the power station 10, the mechanical or aerodynamic rotation speed ($n_{mech}$ or $n^*$, respectively) of the gas turbine 12 can be controlled at a constant value.

However, it is also feasible (FIG. 6) for the aerodynamic rotation speed $n^*$ of the gas turbine 12 to be controlled at a constant value in the permissible mechanical rotation speed range, by regulating the mechanical rotation speed $n_{mech}$ at a constant value, as soon as mechanical or other limit values such as pressures or temperatures are reached, and by readjusting or reducing the mechanical rotation speed $n_{mech}$ when critical pressures or temperatures are reached.

LIST OF REFERENCE SYMBOLS 10, 10' Compressor section
11 Compressor (external)
12 Gas turbine
13 Compressor
14, 14a, 14b Turbine
15, 15' Combustion chamber
16 Air inlet
17, 17' Fuel supply
18 Exhaust gas outlet
19, 19' Shaft
20 Gas inlet
21 Gas outlet
22 Motor/generator
23 Variable frequency drive
24 Electrical grid
25 Motor
26 Switching device
27 Decoupling apparatus
28 Generator
29 Power section
30 Load
31 Controller
32 Switch (bi-directional)
33 Voltage measurement device
34 Current measurement device
35 Control line
36, . . . , 38 Signal line
39 Timer
40 Power station
G1, . . . , G6 Phase (generator)
L1, . . . , L3 Phase (consumer)
V Consumer
$n_{opt}$ Optimal rotation speed
$T_{K1 design}$ Compressor inlet temperature at design conditions
$T_{K1}[K]$ Compressor inlet temperature [Kelvin]
$n_{min}$ Minimum permissible mechanical rotation speed
$n_{max}$ Maximum permissible mechanical rotation speed

What is claimed is:

1. A power station (40) having a turbine section comprising a gas turbine (12) and a generator (28) which is driven directly by the gas turbine (12) and produces alternating current at a first operating frequency, and whose output can be connected to at least one consumer (V) having a predetermined second operating frequency, wherein a frequency converter in the form of a matrix converter is arranged as an electronic decoupling apparatus (27), which decouples the two operating frequencies from one another, between the generator (28) and the at least one consumer (V), the output of the generator (28) can be connected to an electrical grid (24), and a switching device (26) is provided for selective connection of the generator (28) to the electrical grid (24) and to the at least one consumer (V).

2. The power station as claimed in claim 1, wherein the gas turbine (12) is designed for a power of more than 50 MW.

3. The power station as claimed in claim 1, wherein the first operating frequency differs from the second operating frequency.

4. The power station as claimed in claim 3, wherein the first operating frequency is lower than the second operating frequency.

5. The power station as claimed in claim 4, wherein the second operating frequency is 50 Hz or 60 Hz.

6. The power station as claimed in claim 5, wherein the second operating frequency is 60 Hz, and the first operating frequency is 50 Hz.

7. The power station as claimed in claim 3, wherein the first operating frequency is higher than the second operating frequency.

8. The power station as claimed in claim 7, wherein the second operating frequency is 50 Hz or 60 Hz.

9. The power station as claimed in claim 8, wherein the second operating frequency is 50 Hz, and the first operating frequency is 60 Hz.

10. The power station as claimed in claim 1, wherein the matrix converter comprises a plurality of controllable bi-directional switches (32), which are arranged in an (m×n) matrix and selectively connect m inputs to n outputs controlled by a controller (31), where m is greater than n, and wherein a first device (34) is provided for determining polarities of currents in the inputs, and a second device (33) is provided for determining polarities of voltages between the inputs, and wherein the first and second devices (34, 33) are connected to the controller (31) by signal lines (37, 38).

11. The power station as claimed in claim 1, wherein the gas turbine (12) is a gas turbine with sequential combustion (14a, 14b; 15, 15').

12. The power station as claimed in claim 1, wherein the at least one consumer (V) is a compressor (11) which is driven by a motor (25), and in that the compressor (11) is part of an installation for liquefaction of gas.

13. The power station as claimed in claim 1, wherein the at least one consumer (V) is a railway electrical grid.

14. The power station as claimed in claim 1, wherein the at least one consumer (V) is an electrical grid.

15. A method for operation of a power station (40) having a turbine section comprising a gas turbine (12) and a generator (28) which is driven directly by the gas turbine (12) and produces alternating current at a first operating frequency, and whose output can be connected to at least one consumer (V) having a predetermined second operating frequency, wherein a frequency converter in the form of a matrix converter is arranged as an electronic decoupling apparatus (27), which decouples the two operating frequencies from one another, between the generator (28) and the at least one consumer (V), the method comprising:
controlling an aerodynamic rotation speed of the gas turbine (12) at a constant value.

16. A method for operation of a power station (40) having a turbine section comprising a gas turbine (12) and a generator (28) which is driven directly by the gas turbine (12) and produces alternating current at a first operating frequency, and whose output can be connected to at least one consumer (V) having a predetermined second operating frequency, wherein a frequency converter in the form of a matrix converter is arranged as an electronic decoupling apparatus (27), which decouples the two operating frequencies from one another, between the generator (28) and the at least one consumer (V), the method comprising:

controlling an aerodynamic rotation speed of the gas turbine (12) at a constant value in a permissible mechanical rotation speed range, in that the mechanical rotation speed is controlled at a constant value as soon as mechanical or other limit values are reached, and readjusting or reducing the mechanical rotation speed when critical pressures or temperatures are reached.

\* \* \* \* \*